Oct. 23, 1934.  E. A. NELSON  1,977,916
BRAKE MECHANISM
Filed April 6, 1932  3 Sheets-Sheet 1
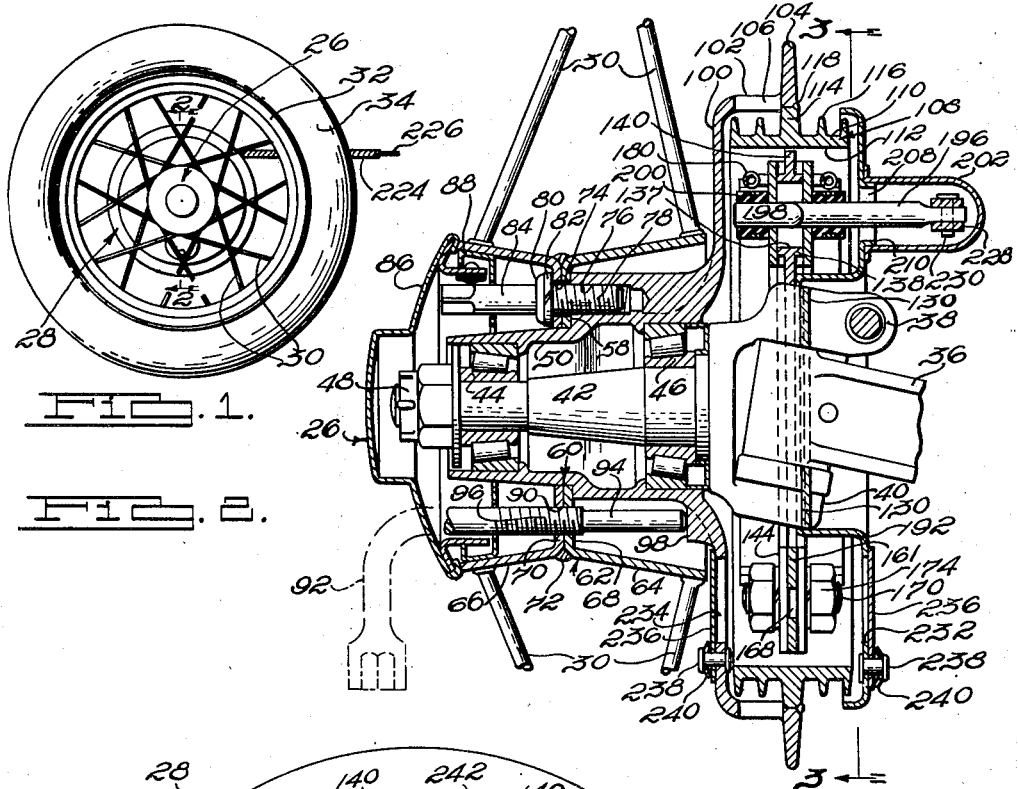
Fig. 1.
Fig. 2.
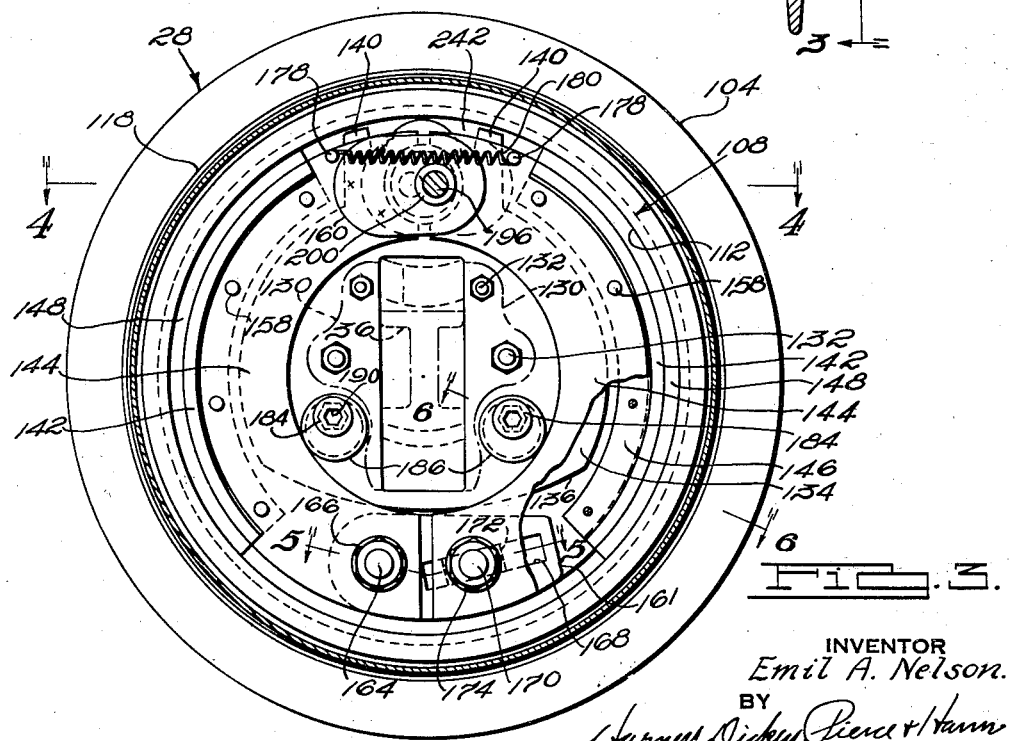
Fig. 3.
INVENTOR
*Emil A. Nelson.*
BY
*Harness, Dickey, Pierce & Hann*
ATTORNEYS

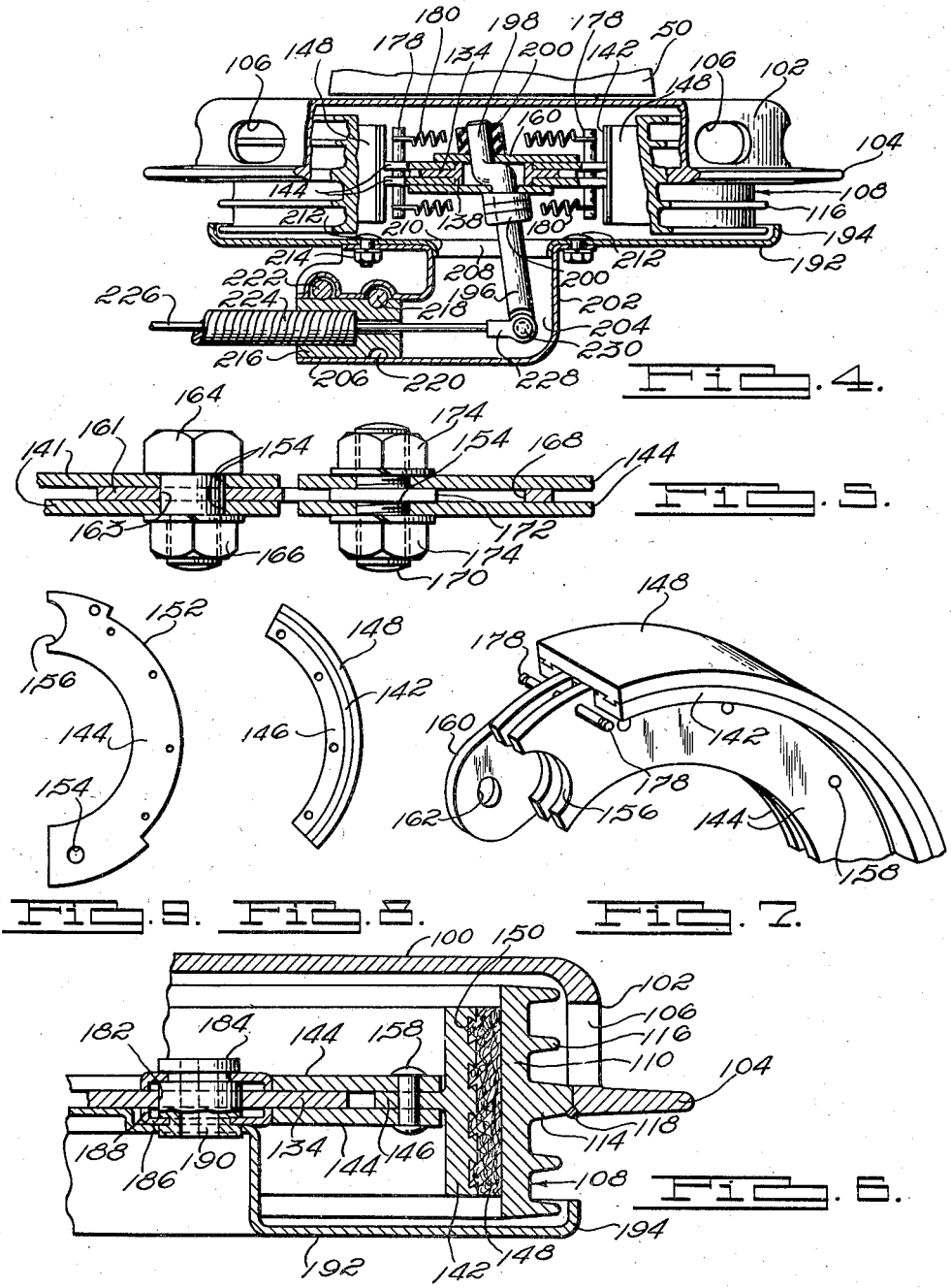

Oct. 23, 1934.  E. A. NELSON  1,977,916
BRAKE MECHANISM
Filed April 6, 1932  3 Sheets-Sheet 3

INVENTOR
Emil A. Nelson.
BY
ATTORNEYS

Patented Oct. 23, 1934

1,977,916

UNITED STATES PATENT OFFICE 1,977,916

BRAKE MECHANISM

Emil A. Nelson, Detroit, Mich.

Application April 6, 1932, Serial No. 603,534

8 Claims. (Cl. 188—78)

This invention relates to brakes and particularly to that type thereof adaptable for use in connection with motor vehicles, the principal object being the provision of a brake mechanism that is efficient in operation, of extreme simplicity in construction, and economical to produce.

Other objects of the invention are to produce a brake mechanism in which the internal mechanism is formed to a great extent by flat sheet metal parts; to provide a brake mechanism having various parts thereof of extreme simplicity in design whereby to enable them to be manufactured at a minimum of expense; to provide a brake mechanism in which the various parts thereof may be assembled at a minimum expense; to provide a brake mechanism that will be free from rattling; and to provide a brake mechanism that will require a minimum amount of effort to overcome the friction between the various parts thereof.

Another object is to provide a new and novel form of brake shoe for an internal type of brake.

Another object is to provide an integral brake drum and wheel hub; to provide a wheel hub with an integral brake ring supporting portion serving to enclose one side of the ring to form a drum; to provide an integral hub and brake ring supporting flange of novel construction; to provide an integral wheel hub and brake ring supporting flange formed from one material and a brake ring supported therein and formed of a different material; and to provide a brake drum structure that is extremely simple in construction, economical to produce, and capable of withstanding a maximum amount of wear.

Other objects are to provide a brake mechanism having a novel form of expanding means; and to provide a brake mechanism having a novel form of construction permitting simplicity and economy in manufacture and so designed as to permit ready assembly and disassembly of the same.

The above being among the objects of the present invention, the same consists in certain features of construction and combinations of parts to be hereinafter described with reference to the accompanying drawings, and then claimed, having the above and other objects in view.

In the accompanying drawings which illustrate suitable embodiments of the present invention, and in which like numerals refer to like parts throughout the several different views:

Figure 1 is a side elevational view of the front wheel of an automobile provided with a brake mechanism constructed in accordance with the present invention;

Fig. 2 is an enlarged fragmentary vertical sectional view taken centrally through the wheel shown in Fig. 1, as on the line 2—2 of Fig. 1;

Fig. 3 is a vertical sectional view taken on the line 3—3 of Fig. 2 and showing in side elevation the interior mechanism of the brake;

Fig. 4 is a horizontal sectional view taken on the line 4—4 of Fig. 3; and which line passes centrally through the brake shoe expanding mechanism of the brake;

Fig. 5 is an enlarged fragmentary sectional view taken on the line 5—5 of Fig. 3, and illustrating in greater detail the means employed for compensating for the wear of the friction elements on the brake shoe;

Fig. 6 is an enlarged fragmentary sectional view taken on the line 6—6 of Fig. 3 and illustrating in greater detail the construction of the adjustable stops for limiting the inoperative position of the brake shoes;

Fig. 7 is a fragmentary perspective view of one of the brake shoes employed in the brake shown in the preceding figures;

Fig. 8 is a reduced side elevational view of the flange member employed in the brake shoe shown in Fig. 7;

Fig. 9 is a reduced side elevational view of one of the web members employed in connection with the brake shoe shown in Fig. 7;

Figure 10:
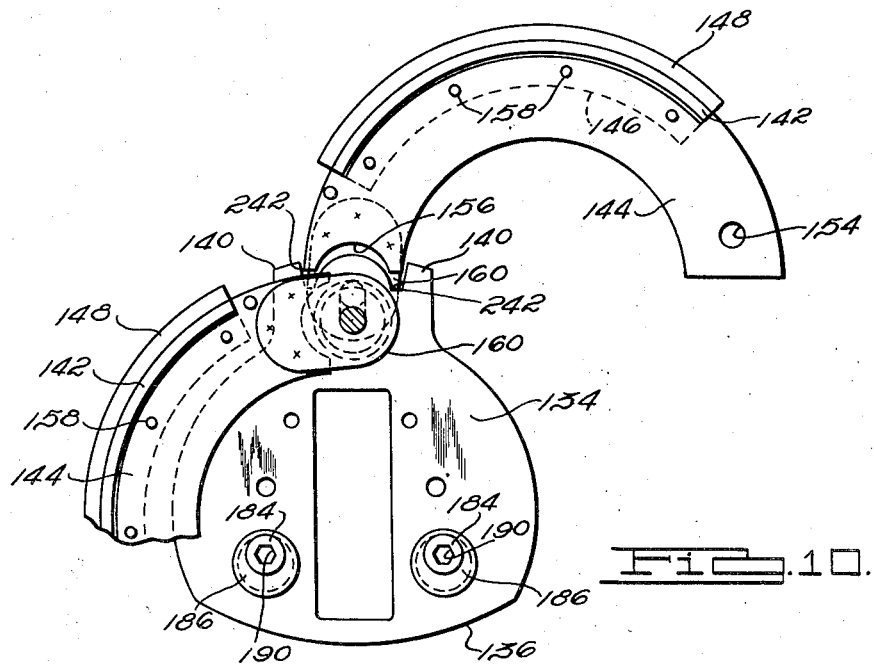
Fig. 10 is a fragmentary side elevational view of the brake shoes and their supporting plate and illustrating diagrammatically the manner of manipulating one of the shoes to permit assembly or disassembly thereof.

Referring to Fig. 1, I show an automobile wheel including a hub structure indicated generally as at 26 supporting a brake drum indicated generally as at 28 and spokes 30 which are secured to a rim 32 to which, in turn, is secured a tire 34 of conventional construction.

Referring now to Figure 2, which is a fragmentary, vertical sectional view, taken centrally through the wheel indicated in Fig. 1, an automobile front axle is indicated at 36 to which is pivotally secured in a conventional manner a steering knuckle comprising upper and lower yoke portions 38 and 40 respectively and wheel spindle 42. Rotatably supported upon the spindle 42 by means of roller bearing assemblies 44 and 46 and maintained against axial displacement thereon by the nut 48, is a wheel hub 50. Although, in the broader aspects of certain phases of the present invention, the specific construction of the wheel hub 50 is more or less unimportant; the particular embodiment thereof shown is provided with an approximately central radially directed shoulder 58 against which seats the radially inwardly directed flange 60 of the wheel hub shell 62, the latter being composed of two opposed tapered rings 64 and 66 having radially inwardly turned abutting marginal flanges 68 and 70 respectively at the adjacent ends thereof, and which are welded together as at 72. The spokes 30 are welded at their inner ends to the inner and outer margins of the hub shell 62.

The flange 60 of the wheel hub shell 62 is provided therearound with a plurality of equally angularly spaced openings 74, and an equal number of aligned threaded openings 76 are provided in the shoulder 58 of the hub 50 and studs 78 project through each of the openings 74 and are threaded into the corresponding of the openings 76, each stud being provided with a head 80 for clamping the flange 60 securely against the shoulder 58, preferably through the intermediary of a lock washer 82. The studs 78 are each preferably provided with an elongated head portion 84 which terminates adjacent the outer end of the wheel hub shell 62 so as to be readily available for the application of a wrench thereto when the hub cap 86, suitably carried by the outer end of the wheel hub shell 62, is removed. A stamped metal ring 88, suitably secured within the outer end of the wheel hub shell 62, and provided with openings 90 aligned with the openings 74 and 76 and through which the heads 84 of the studs 78 project, is provided for maintaining the assembled relation between the wheel hub shell 62 and the studs 78 upon removal of the wheel from the hub.

Between each of the openings 74 a threaded opening 90 is provided in the wheel hub flange 60. These openings 90 are provided for cooperation with a suitable wrench such as 92 which may be employed for the purpose of forcibly loosening the wheel from the hub after the hub cap 86 has been removed and the studs 78 threaded out of the openings 76. The wrench 92 includes an extended unthreaded end portion 94 and threaded body portion 96 of a diameter corresponding with the diameter of the openings 90. In employing the wrench 92, the end 94 is projected through one of the openings 90 and the portion 96 thereof is threaded into the corresponding opening 90 until the extremity of the end 94 engages a pad or boss such as 98 provided for this purpose at the inner edge of the hub 50. Upon continued threading of the wrench 96 into the opening 90 it will be apparent that the end 94 bearing upon the pad 98 will force the wheel outwardly away from the shoulder 58 and thus permit its ready removal from the hub.

In accordance with one of the objects of the present invention, the inner end portion of the hub 50 is extended radially outwardly as at 100 to form a disc-like web or flange, which merges at its outer end into the side edge of an annular ring portion 102 which extends therefrom inwardly relative to the hub and at its inner margin is provided with a radially, outwardly extending peripheral annular rib or flange 104. The ring 102 is provided around its periphery with a plurality of openings 106 therethrough, the purpose of which will be later described.

Within the ring 102 is received and secured a brake ring indicated generally as at 108, and comprising an annular ring 110 having a smooth cylindrical inner face 112, a major central radially outwardly extending rib or flange 114, and a plurality of smaller or minor radially outwardly directing ribs or fins 116. The external diameter of the central rib 114 and the internal diameter of the outwardly extending rib or flange 104 are machined to complementary dimensions and are then brought into telescoping or nested relationship as indicated, and are then preferably welded together along their line of contact as at 113, thus effecting an integral structure including the brake ring 108, the ring 102, web or disc 100 and hub 50. The hub 50 and the parts 100, 102 and 104 originally formed integrally therewith will usually be composed of malleable iron or steel forging, although it is to be understood that other material may be employed where desired, and the brake ring 108 will ordinarily be formed of cast iron, special steel alloy, or other suitable material.

By this construction it will be noted that the parts 100, 102 and 104, being formed integrally with the hub 50, provide a unitary structure which may be formed and machined at minimum expense while insuring absolute concentricity between the various parts thereof. The ring 108, being welded to this integral structure so as to form an integral part thereof permits machining of the inner face 112 thereof at the same time as other parts of the assembly and thus insures absolute concentricity of such face with other surfaces of the assembly. It is to be noted that the outer edge of the brake ring 108 is preferably spaced with relation to the disc or web 100, this being for the purpose of permitting air to escape around the side of the ring 108 and out through the openings 106 in the annular ring 102, thereby aiding in and increasing the cooling efficiency of the brake. In addition, it will be noted that the central flange 114 combines with the radial flange 104 to provide a central flange for the brake ring of maximum dimensions whereby to impart a maximum amount of rigidity to the ring 108 and with the minor fins 116 to produce a maximum amount of heat radiating surfaces for the brake ring 108. It might be noted incidentally that in supporting the brake ring 108 centrally of its edges as indicated, any tendency of the brake ring 108 to distort out of its true cylindrical form under brake operating pressures or heat, is effectively eliminated.

As best illustrated in Figs. 2 and 3, the steering knuckle yoke portions 38 and 40 are provided with integral forwardly and rearwardly directed flanges 130 whose inner and outer faces are positioned radially with respect to the brake ring 108 and whose inner face is approximately aligned with the central plane thereof. Rigidly secured to the flanges 130 by means of screws such as 132 (see Fig. 3) is a supporting plate 134 for the mechanism within the brake drum. This plate 134, as best indicated in Figs. 2 and 10, is substantially flat throughout and may be formed from sheet metal. It is generally circular in side elevation with the exception that its bottom surface is cut away as at 136, best shown in Fig. 10, to provide clearance for the linkages connecting the lower end of the brake shoe as will presently be described. Centrally of the upper portion of the supporting plate 134 a circular opening 137 is provided therein and this opening is cylindrically collared in any suitable manner as at 138 for a purpose to be described later. The metal of the supporting plate 134 is extended upwardly as at 140 both forwardly and rearwardly of the collar 138 for the purpose of additionally guiding the brake shoes at their free ends as will presently be apparent.

Two brake shoes are provided and their construction is best indicated in Figs. 6 to 9 inclusive and, as illustrated in those figures, each brake shoe includes a flange portion 142 and a pair of spaced web portions 144, all of which are circularly segmental in contour. As best illustrated in Figs. 6 and 8, the flange portion 142 is shorter than the web portions 144 and includes a short central radially inwardly directed rib or flange 146, the thickness of which is slightly greater than the thickness of the supporting plate 134. The member 142 may be formed in any suitable manner such as from a rolled section, and it supports on its outer face the usual strip of friction material 148. The manner in which this friction material 148 is secured to the flange member 142 is immaterial as far as the present invention is concerned, the particular means shown comprising dovetail grooves 150 formed in the peripheral face of the member 142 and in which the inner complementary face of the friction material 148 is interlocked.

The web members 144 are each formed from flat sheet metal and their outer peripheries are cut away as at 152 over a length equal to the length of the flange member 142 and for a depth corresponding approximately with the thickness thereof so that the latter may be received therein. One end of each member 144 is provided with an opening 154 and its opposite end is recessed as at 156 on a circle corresponding with the curvature of the outer periphery of the collar 138 on the supporting plate 134.

One of the web members 144 is positioned against the flange member 142 on each side of the central flange or web 146 thereof, with the flange member 142 received in the recesses 152, and the web members 144 are secured to the flange member 142 in such position by means of rivets 158 or equivalent means extending through the rib 146, it being understood that in thus assembling the webs 144 to the flange member 142 the openings 154 in the web members 144 and the recesses 156 are aligned in the completed shoe. In addition, a cam plate member 160 is secured to the outer face of one only of the web members 144 of each shoe assembly, in a position to project beyond the recessed end 156 thereof, and in the projecting portion thereof an opening 162 is provided. Although the plate 160 may be removably secured to the corresponding web member 144 if desired, I prefer, where it is possible to disassemble the brake mechanism without removal of plate 160 as will hereinafter be described in connection with Fig. 10, that they be permanently secured in place as by welding, thus resulting in a more efficient construction and one which is more economical to produce. It may also be noted that the plates 160 are secured in a corresponding position on each of the shoe assemblies so that when two shoes are positioned in operative relationship with respect to each other, the plates 160 will overlap the corresponding end faces of the other shoe and will be located on opposite sides of each double shoe assembly.

In view of the fact that the web members 144 are spaced from each other by their corresponding rib member 146 a distance slightly greater than the supporting plate 134, it will be apparent that the shoes may be positioned around the periphery of the supporting plate 134 with the outer margins of such supporting plate embraced between the web members 144, and this is the manner in which the shoes are positioned and supported within the brake drum. This manner of positioning and supporting the brake shoes permits ready expanding and contracting movement thereof without setting up any appreciable friction and at the same time positively maintains the brake shoes centrally of the brake assembly and, due to the relatively large area of contact between them, effectively prevents any tendency towards rattling of these parts.

As best illustrated in Figs. 3 and 5, the lower ends of the brake shoes are pivotally connected together through the intermediary of a link plate 161 which is received between the web members 144 of the corresponding brake shoes. One end of this link plate 161 is provided with an opening 163 which is aligned with the openings 154 in the web members 144 and through which extends a shouldered bolt 164 maintained in place by the nut 166 so as to provide free pivotal movement between the connected parts.

The other end of the link plate 161 which is received between the ends of the web members 144 on the other brake shoe is provided with an elongated slot 168. A stud 170 projects through the slot 168 and the openings 154 in the corresponding end of the corresponding brake shoe and is provided with a central rectangular enlargement 172 slidably received in the slot 168 and which thereby prevents turning of the stud. Nuts 174 threaded on the stud 170 on opposite sides of the web members 144 provide means whereby the corresponding ends of the web members 144 may be drawn together in clamping relation with respect to the link plate 161, thereby rigidly clamping the same to the corresponding brake shoe with sufficient force to take care of any brake reaction which may be transmitted between the two brake shoes in operation.

As best illustrated in Figs. 4 and 7, the free end of each brake shoe is provided with oppositely extending pins 178 between which is tensioned a pair of coil springs 180 which constantly urge the free ends of the brake shoes together and to cause the recesses 156 formed therein to embrace the outer periphery of the collar 138 on the supporting plate 134, the collar 138 thus serving as a stop member for the ends of the brake shoes when they are in their inoperative position as well as to transmit the braking torque from the shoes to the supporting plate 134 as will later be apparent.

Stop members are provided for limiting the retractive movement of the lower part of the shoes with respect to the brake drum in the following manner, reference being particularly had to Figs. 3 and 6. As best indicated in these figures, the supporting plate 134 is provided with two spaced openings 182 on either side of the vertical center line of the brake assembly and adjacent the lower end thereof. Rotatably received within each of these openings is a plug member 184 and mechanically interlocked with each plug member 184 on opposite sides of the supporting plate 134 is a cam ring 186 having inwardly directed peripheral cam flanges 188, the edges of which frictionally engage the sides of the plate 134. The plug members 184 are preferably provided internally thereof with an opening 190 of irregular contour adapted to receive the end of a winch or other tool provided for the purpose of turning them. As will be apparent from an inspection of Figures 3 and 6, the periphery of the cam members 186 are adapted to engage the inner edge of the web members 144 of the brake shoes and thus limit the inward movement of the brake shoes. As will be apparent, by rotating the plugs 184 and their corresponding cam members 186, the amount which the brake shoes may retract upon release of the brake may be accurately determined.

It may be noted at this point that the inner ends of the plugs 184 preferably project through aligned openings in the cover member 192 provided for the open end of the brake drum. This cover member, which is preferably formed from sheet metal, is preferably secured in place by being clamped between the flange members 130 on the steering knuckle, and the supporting plate 134, and its periphery extends beyond the outer periphery of the brake ring 108 and is there inwardly turned as at 194 over the outer fin 116 in such a manner as to so cooperate with such outer fin 116 to prevent the direct passage of any mud or water or other foreign material from the wheels or road surface directly to the interior of the brake mechanism. Incidentally, the openings 106 in the annular portion 102 of the brake ring supporting means are preferably similarly arranged with respect to the corresponding side edge of the brake ring 108.

In order to provide means for expanding the brake shoes into contact with the brake drum, I provide a bar or lever element 196, as best illustrated in Figs. 2 and 4, and which is provided with an eccentrically offset end portion 198. The end portion 198 is relatively loosely received in the opening 162 in the outer of the plate members 160 carried at the free end of the right hand brake shoe (as viewed in Fig. 3) and the body portion of the lever member 196 is similarly received in the opening 162 in the inner of the plate members 160 on the other brake shoe, the connecting portion between the main body 196 and offset portion 198 serving to prevent axial displacement of the lever member 196. As a means of preventing possible rattling developing between the lever member 196 and the plate 162 rubber collars 200 are preferably provided encircling the lever member 196 inwardly and outwardly beyond the plates 160 and in contact therewith, these rubber collars being maintained in position in any suitable manner.

In order to operate the lever member 196 I provided a sheet metal housing 202 on the side of the cover plate 192, such housing including a main chamber portion 204 and an angularly or rearwardly extending cylindrical neck portion 206. The cover member 192 is apertured as at 208 and the metal of the cover plate, around the margins of the opening, is outwardly turned as at 210 to form a collar which is received in the housing 202 and serves to locate it on the cover 192. Bolts 212 and nuts 214 are provided for the purpose of clamping the housing member 202 against displacement on the cover plate 192.

Within the neck portion 206 of the housing 202 is received a plug member 216 which is maintained against axial displacement therein by means of a bolt 218 intersecting the peripheral slot 220 formed in the plug 216, and the extremity of the neck portion 202 is slotted in the conventional manner (not shown) and a second bolt 222 is provided for contracting the split portion about the plug 216 in order to more firmly hold it in position. Secured within the outer end of the plug 216 is the end of a flexible tubular member 224, shown in the form of a wire coil, and within which is axially slidably received an operating wire or cable 226, thus effecting a result similar to that obtained in the well known Bowden wire construction. The cable 226 projects through the plug 216 into the chamber 204 within the housing 202 and is provided therein at its end with a clevis or yoke 228 which is pivotally secured by means of a pin 230 to the outer end of the operating lever 196.

In applying the brake mechanism to a motor vehicle any suitable or conventional means may be provided for applying a suitable pulling force on the cable 226. When this occurs the lower end of the lever arm 196, as viewed in Fig. 4, is moved to the left, its opposite end then acting as a lever against the plate 160 at the free end of the brake shoe to force the free end of the left hand brake shoe to the left and the free end of the right hand brake shoe to the right. In moving the free ends of the brake shoes in this manner it will be apparent that their effective diameter is increased and accordingly upon continuation of the movement in this direction, either one or both of the brake shoes will finally contact with the inner surface 112 of the brake ring 108. Also referring to Fig. 3 it will be apparent that when this occurs, the friction set up between the brake shoes and the brake ring tends to carry the shoe assembly around with the brake drum. Considering the brake drum to be turning in a clockwise direction as viewed in Fig. 3, it will then be apparent that the brake shoe assembly in being rotated with the drum, will bring the recessed portion 156 at the free end of the left hand brake shoe into contact with the collar 138 on the supporting plate 134, and this collar will thereafter provide a stop to prevent further rotational movement of the brake shoe assembly with the drum, and consequently will receive the braking torque from the shoe and transmit it through the plate 134 to the steering knuckle and axle.

When the operation of the mechanism has reached the above point it will also be obvious that further movement of the operating lever 196 will cause a further expanding movement of the brake shoe assembly and force it into firmer engagement with the braking surface to effect a greater braking action. It will also be apparent that as soon as one of the free ends of the brake shoes has come into contact with the collar 138 so that the latter thus serves as a stop to prevent the rotational movement of the brake shoe assembly, the walls of the opening 162 of the plate 160 secured to such free end will then serve as the fulcrum point for further pivotal movement of the lever arm 196 and this condition of operation will result regardless of the direction of rotation of the brake drum. As soon as the pull on the cable 226 is released the springs 180 will exert a sufficient force to bring both of the free ends of the brake shoes back into contact with the collar 138 and to pull the lower portions of the brake shoes up into contact with the cooperating faces of the stop cam members including the plugs 184, in which position the brake shoes will be free of contact from the operative faces of the brake drum.

The cover plate 192 is provided with an opening 232 in alignment with the stud 170 and nuts 174 which fix the link plate 161 with respect to the corresponding end of the corresponding brake shoe. The web 100 of the brake drum is provided with a similar opening 234 which may also be brought into alignment with the stud 170 and nuts 174 upon proper rotation of the brake drum. Each of the openings 232 and 234 is provided with a pivotable cover 236 secured to the cover plate 192 and web 100 respectively by means of a rivet 238 and spring washer 240. The purpose of the openings 232 and 234 is to permit engagement of the nuts 174 by suitable wrenches when it becomes necessary to adjust the brake to compensate for wear occurring on the friction linings 148. The covers 236 are provided for preventing the entrance of dust, dirt or other foreign matter to the interior of the brake assembly at all other times and may simply be swung about the axes of the rivets 238 to expose the openings 232 and 234 in event such adjustment is necessary.

Figure 11:
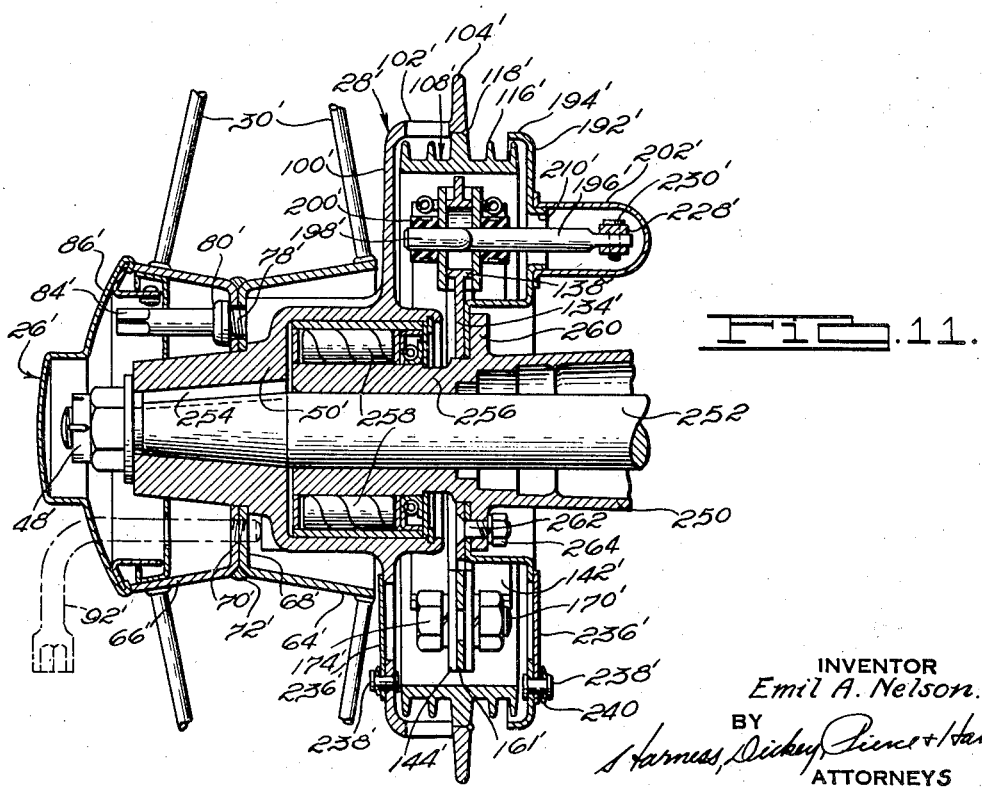
Fig. 11 is a vertical sectional view similar to Fig. 2, but showing my improved brake mechanism applied to the rear wheel of a motor vehicle.

In order to adjust the brake for such wear, all that is necessasry is to swing the cover plates 236 away from the openings 232 and 234, so as to expose the latter and then rotate the brake drum so as to bring the opening 234 into alignment with the opening 232, after which a wrench may be inserted from each side of the brake drum so as to engage the nuts 174 and loosen them on the stud 170, which thus releases the cam link 161 from clamping engagement between the corresponding ends of the webs 144 of the corresponding brake shoes. After this has been done and while the free ends of the shoes are in engagement with the collar 138 the cam stop members 184 are rotated so as to force the connected ends of the brake shoes outwardly into firm contact with the brake drum, the stud 170 sliding in the slot 168 to permit this movement, and the nuts 174 are then again tightened so as to lock the link plate 161 in its newly adjusted position. After such an operation it will be found that the brake shoes are again located in closely spaced relationship with respect to the brake drum when in inoperative position, and so that a minimum amount of pivotal movement of the operating lever 196 is required to apply the brake.

Where the cam plates 160 are permanently attached to the ends of the shoes, as previously described, then a certain method of disassembling brakes must be observed, and this is more-or-less diagrammatically indicated in Fig. 10. In disassembling the brake, the wheel hub and all of the parts carried thereby are first removed, thus exposing the internal brake mechanism. The bolt 164 or the stud 170 is then removed and the rubber sleeve 200 on the outer end of the operating arm 196 is also removed. That brake shoe having its corresponding cam plate 160 located on the outer side of the supporting plate 134 is next pivoted about the end 198 of the operating lever 196 until it assumes a position equivalent to that indicated for the right hand shoe in Fig. 10. The lever 196 is then rotated so as to bring the end 198 thereof to its uppermost position, which thus permits the corresponding ends of the rotated brake shoe to be raised a corresponding amount. It will be noted that the metal between the upwardly projecting portions 140 of the supporting plate 134 is cut away as more-or-less indicated at 242 to a shape more-or-less complementary to the corresponding end of the brake shoes when rotated to the position of the one indicated in Fig. 10, so as to provide sufficient clearance for the extremities of such end to move transversely with respect to the supporting plate 134 and thus be slipped off at the end 198 of the operating lever 196. After removal of the first shoe in this manner, the operating lever 196 may then be pulled through the opening 162 in the remaining cam plate 160 far enough to permit removal of the pin 30, after which it may be pulled completely through the opening 162 and the remaining brake shoe simply lifted off of the plate 134.

Where the brake is employed in connection with the rear or non-steering wheels of a motor vehicle, the essential features of the construction heretofore described are retained and only such changes are made as are required by the difference in structure of such axle. Such a structure is illustrated in Fig. 11 in which parts identical to those previously described are indicated by the same numerals, but which numerals bear a prime mark. Instead of the axle and steering knuckle construction previously described, such rear axle will usually include an axle housing such as 250 through which the live axle 252 projects and the end of which is secured to a hub 50' which is somewhat modified over the construction previously described, in order to transmit the driving torque, it being understood that a key such as 254 or equivalent means is provided for non-rotatably securing the axle 252 to the hub structure. Also in such case, the axle housing 250 is usually provided with a cylindrical extension such as 256 between which and the hub is provided a series of bearing members such as 258 for transmitting the load between the wheels and the axle housing.

In this case the axle housing 250 is provided with a radially outwardly directed flange 260, corresponding with the flange 130 previously described, and to which the supporting plate 134' is secured by bolts 262 and nuts 264. The remaining construction and the operation of this brake is identical to that first discussed and further description of the same is deemed unnecessary.

Although but one specific modification of the brake mechanism and two illustrations of its adaptation to a motor vehicle is herein disclosed, it will be apparent that numerous changes and modifications may be apparent to those skilled in the art and, accordingly, it will be understood that formal changes may be made in the specific embodiment of the invention described without departing from the spirit or substance of the broad invention, the scope of which is commensurate with the appended claims.

I claim:

1. In combination, a brake drum, a supporting member therein having a radially disposed margin, a friction element having a pair of inwardly directed webs slidably embracing opposite sides of said member, means for moving said element into contact with said drum, and a hollow stop carried by said member and engageable with a free end of said element to limit rotational movement thereof with respect to said member.

2. In combination, a brake drum, a supporting member therein having a radially disposed margin, a friction element having a pair of inwardly directed webs slidably embracing opposite sides of said member, a hollow stop carried by said member in a position to engage a free end of said element, a plate secured to said end and projecting across a face of said stop and having an opening therein, and an operating member projecting through said stop and received in said opening.

3. In combination, a brake drum, a supporting member therein having a radially disposed margin, a pair of connected brake shoes having a pair of inwardly directed spaced webs slidably embracing said margin therebetween, a hollow stop fixed to said member, a plate fixed to the free ends of said shoes and projecting across opposite faces of said stop, and an operating member projecting through said stop and operatively engaging said plates.

4. In combination, a brake drum, a supporting member therein having a radially disposed margin, a pair of connected brake shoes having a pair of inwardly directed spaced webs slidably embracing said margin therebetween, a stop fixed to said member engageable with the free ends of said shoes for limiting rotational movement thereof, means for moving said shoes into contact with said drum, spring means urging said shoes out of contact with said drum, and cam means rotatably mounted on and frictionally engaging said member adapted for engagement with at least part of said webs for limiting the retracted position of said shoes.

5. In combination, a brake drum, a supporting member therein having a radially disposed margin, a pair of connected brake shoes having a pair of inwardly directed spaced webs slidably embracing said margin therebetween, a hollow stop fixed to said member, a plate fixed to the free ends of said shoes and projecting across opposite faces of said stop, and an operating member projecting through said stop and operatively engaging said plates, said operating member including a pair of portions axially offset from one another and each engaging one of said plates.

6. In combination, a brake drum, a supporting member therein having a radially disposed margin, a pair of connected brake shoes having a pair of inwardly directed spaced webs slidably embracing said margin therebetween, a hollow stop fixed to said member, a plate fixed to the free ends of said shoes and projecting across opposite faces of said stop, an operating member projecting through said stop and operatively engaging said plates, and rubber sleeves surrounding said operating member on the outer side of each of said plates.

7. In combination, a brake drum, a supporting member therein having a radially disposed margin, a pair of connected brake shoes having a pair of inwardly directed spaced webs slidably embracing said margin therebetween, a hollow stop fixed to said member, a plate fixed to the free ends of said shoes and projecting across opposite faces of said stop, and an operating member projecting through said stop and operatively engaging said plates, said supporting member being cut away radially outwardly of said stop to a shape complementary to the shape of the end of one of said shoes whereby to permit said shoe to be moved laterally of said supporting member when pivoted outwardly about said operating member.

8. In combination, a pair of brake shoes, a link pivoted to one of said shoes, said link having a slot therein overlapping an end of the other of said shoes, a bolt extending through said slot and the corresponding of said ends, and means engageable with said bolt for clamping said link and said corresponding end against relative movement.

EMIL A. NELSON.